US011174751B2

(12) United States Patent
Kulkarni et al.

(10) Patent No.: US 11,174,751 B2
(45) Date of Patent: Nov. 16, 2021

(54) METHODS AND SYSTEM FOR CLEANING GAS TURBINE ENGINE

(71) Applicant: General Electric Company, Schenectady, NY (US)

(72) Inventors: Ambarish Jayant Kulkarni, Schenectady, NY (US); Bernard Patrick Bewlay, Schenectady, NY (US); Byron Andrew Pritchard, Jr., Loveland, OH (US); Nicole Jessica Tibbetts, Delanson, NY (US); Michael Edward Eriksen, Cincinnati, OH (US); Eric John Telfeyan, Delanson, NY (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 15/443,048

(22) Filed: Feb. 27, 2017

(65) Prior Publication Data

US 2018/0245477 A1    Aug. 30, 2018

(51) Int. Cl.
*F01D 25/00*    (2006.01)
*F02C 7/30*    (2006.01)
(Continued)

(52) U.S. Cl.
CPC ............. *F01D 25/002* (2013.01); *B08B 3/02* (2013.01); *B08B 9/00* (2013.01); *F02C 7/30* (2013.01);
(Continued)

(58) Field of Classification Search
None
See application file for complete search history.

(56) References Cited

U.S. PATENT DOCUMENTS

| 17,021 A | 4/1857 | Butterfield |
| RE17,021 E | 7/1928 | Wier |

(Continued)

FOREIGN PATENT DOCUMENTS

| CN | 105312270 A | 2/2016 |
| EP | 3061923 A1 | 8/2016 |

(Continued)

OTHER PUBLICATIONS

International Search Report and Written Opinion issued in connection with corresponding PCT Application No. PCT/US2018/016540 dated May 18, 2018.
(Continued)

*Primary Examiner* — Mikhail Kornakov
*Assistant Examiner* — Pradhuman Parihar
(74) *Attorney, Agent, or Firm* — Fitch, Even, Tabin & Flannery, LLP

(57) ABSTRACT

A method for cleaning components of a gas turbine engine is presented. The method includes introducing a working fluid into a gas flow path or a cooling circuit defined by the one or more components of the gas turbine engine such that the working fluid impinges upon a surface of the one or more components of the gas turbine engine, wherein the working fluid includes a plurality of detergent droplets entrained in a flow of steam. A system for cleaning components of a gas turbine engine are also presented.

19 Claims, 10 Drawing Sheets

(51) Int. Cl.
*B08B 9/00* (2006.01)
*B08B 3/02* (2006.01)
(52) U.S. Cl.
CPC .... *B08B 2230/01* (2013.01); *F05D 2220/323* (2013.01)

(56) References Cited

U.S. PATENT DOCUMENTS

| | | | |
|---|---|---|---|
| 1,910,454 | A | 12/1928 | Wier |
| 2,627,015 | A | 8/1948 | Hackman |
| 4,581,074 | A | 4/1986 | Mankina et al. |
| 5,443,085 | A | 8/1995 | Huddas |
| 5,601,792 | A * | 2/1997 | Hug .................. F01N 13/0093 422/169 |
| 6,073,637 | A * | 6/2000 | Hayward .................. B08B 3/02 134/198 |
| PP17,021 | P2 | 8/2006 | Arts |
| 8,790,467 | B2 | 7/2014 | Ponomarev |
| 2004/0016445 | A1 | 1/2004 | Koch et al. |
| 2005/0008474 | A1* | 1/2005 | Stalder .................. B05B 1/3013 415/116 |
| 2008/0023037 | A1 | 1/2008 | Kool et al. |
| 2011/0197923 | A1* | 8/2011 | Battaglioli ................ B08B 3/02 134/18 |
| 2014/0066349 | A1 | 3/2014 | Hughes et al. |
| 2014/0304969 | A1 | 10/2014 | Ponomarev |
| 2015/0159122 | A1* | 6/2015 | Tibbetts ............... C11D 7/3209 134/22.18 |
| 2015/0354403 | A1* | 12/2015 | Ekanayake ........... F01D 25/002 60/805 |
| 2016/0024438 | A1 | 1/2016 | Tibbetts et al. |
| 2016/0076456 | A1 | 3/2016 | Ekanayake et al. |
| 2016/0236799 | A1 | 8/2016 | Bewlay et al. |
| 2016/0251978 | A1 | 9/2016 | Sales, Jr. et al. |
| 2016/0355965 | A1* | 12/2016 | Ye ......................... D06F 58/203 |

FOREIGN PATENT DOCUMENTS

| | | |
|---|---|---|
| JP | 2001/214755 A | 8/2001 |
| WO | WO97/15407 A1 | 5/1997 |
| WO | WO2009/135628 A1 | 11/2009 |

OTHER PUBLICATIONS

Taiwan Search Report Corresponding to Application No. 107104948 dated Nov. 15, 2019.
European Search Report Corresponding to Application No. 18758223 dated Oct. 16, 2020.

* cited by examiner

```
                                      ← 1000

┌─────────────────────────────────┐
    │  Introduce a detergent and steam│ ─ 1001
    │    into an atomizing nozzle     │
    └─────────────────────────────────┘
                   │
                   ▼
    ┌─────────────────────────────────────┐
    │ Atomize the detergent in the atomizing nozzle │ ─ 1002
    └─────────────────────────────────────┘
                   │
                   ▼
    ┌─────────────────────────────────────┐
    │ Form a working fluid comprising detergent │ ─ 1003
    │   droplets entrained in a flow of steam   │
    └─────────────────────────────────────┘
                   │
                   ▼
    ┌─────────────────────────────────┐
    │  Discharge the working fluid into│ ─ 1004
    │     a fluid delivery mechanism   │
    └─────────────────────────────────┘
                   │
                   ▼
    ┌─────────────────────────────────────┐
    │ Introduce the working fluid into a gas │
    │ flow path or the cooling circuit via the│ ─ 1005
    │      fluid delivery mechanism           │
    └─────────────────────────────────────┘
```

┌────────────────────────────────────────────┐
│ Introduce a detergent into an atomizing nozzle │─ 2001
└────────────────────────────────────────────┘
                      │
                      ▼
┌────────────────────────────────────────────┐
│ Atomize the detergent in the atomizing nozzle │─ 2002
└────────────────────────────────────────────┘
                      │
                      ▼
┌────────────────────────────────────────────┐
│ Discharge the atomized detergent into a flow of steam │─ 2003
└────────────────────────────────────────────┘
                      │
                      ▼
┌────────────────────────────────────────────┐
│ Form a working fluid comprising detergent  │─ 2004
│ droplets entrained in a flow of steam      │
└────────────────────────────────────────────┘
                      │
                      ▼
┌────────────────────────────────────────────┐
│ Discharge the working fluid into           │─ 2005
│ a fluid delivery mechanism                 │
└────────────────────────────────────────────┘
                      │
                      ▼
┌────────────────────────────────────────────┐
│ Introduce the working fluid into a gas flow path or the │─ 2006
│ cooling circuit via the fluid delivery mechanism        │
└────────────────────────────────────────────┘
```

FIG. 6

METHODS AND SYSTEM FOR CLEANING GAS TURBINE ENGINE

BACKGROUND

Embodiments of the disclosure generally relate to methods and system for cleaning components of gas turbine engines. More particularly, embodiments of the disclosure relate to methods and system for cleaning components of gas turbine engines using a mixture of steam and atomized detergent.

Turbines, such as gas turbine engines, may typically intake foreign material (e.g., particulate matter) during operation that may affect the performance of the engines. Non-limiting examples of the foreign material include dust (including mineral dust), sand, dirt, fly ash, volcanic ash, and runway debris.

For hot turbine engine components, foreign material compositions of particular concern are those containing oxides of calcium, magnesium, aluminum, silicon, and mixtures thereof. These oxides combine to form contaminant compositions comprising mixed calcium-magnesium-aluminum-silicon-oxide systems (Ca—Mg—Al—SiO), hereafter referred to as "CMAS." At the high turbine operating temperatures, these environmental contaminants can adhere to the heated component surface, and thus cause damage to the structural integrity of the components that may result in premature component failure. Premature component failure can lead to unscheduled maintenance as well as parts replacement resulting in reduced performance, and increased operating and servicing costs.

Further, gas turbine engines, typically include internal cooling circuits that are designed to cool one or more components during use. Ingestion and subsequent deposition of the foreign material in these internal cooling circuits may result in partial or complete blockage of the cooling circuits, thereby reducing the cooling efficiency of the circuits. In addition to blocking or clogging the cooling circuits, the foreign material may also become deposited on the internal surfaces of cooled components and create an insulating layer, thereby reducing the cooling efficiency and resulting in operating temperature increase and reduction of the component's life.

However, most of these turbine engine components are typically either not cleaned or cleaned through methods that are expensive, time consuming, labor intensive, or ineffective. For example, typical methods of cleaning the engine components include water wash, dry ice treatment, or acid wash. Water wash and dry ice treatment are not very effective in cleaning CMAS-based secondary reaction products. Acid wash treatments are generally only applied following engine disassembly in a service repair shop environment, as these acid solutions are not compatible with the full suite of materials that comprise the assembled engine. Therefore, if using conventional cleaning methods, the turbine engines may need to be removed from service (e.g., detached from the aircraft, power plant or other machine that the engine powers or is otherwise used with) and substantially dismantled to provide direct access to the components for cleaning. This significantly reduces time-on-wing and impacts the operating and maintenance costs.

Therefore, there is a need for methods and systems of cleaning turbine engine components without substantially dismantling the engine, and without interfering with the structural and metallurgical integrity of other components of the engine.

BRIEF DESCRIPTION

In one aspect, the disclosure relates to a method for cleaning one or more components of a gas turbine engine. The method includes introducing a working fluid into a gas flow path or a cooling circuit defined by the one or more components of the gas turbine engine such that the working fluid impinges upon a surface of the one or more components of the gas turbine engine, wherein the working fluid includes a plurality of detergent droplets entrained in a flow of steam.

In another aspect, the disclosure relates to a method for in-situ cleaning of a cooling circuit defined by one or more components of a gas turbine engine. The method includes forming a working fluid including a plurality of detergent droplets entrained in a flow of steam, wherein the plurality of detergent droplets is characterized by a size distribution that is effective to be substantially accommodated in the cooling circuit. The method further includes introducing the working fluid into the cooling circuit such that the working fluid impinges upon a surface of the one or more components of the gas turbine engine.

In yet another aspect, the disclosure relates to a system for cleaning one or more components of a gas turbine engine. The system includes a fluid mixing unit configured to form a working fluid including a plurality of detergent droplets entrained in a flow of steam. The system further includes a fluid delivery mechanism fluidly coupled with the fluid mixing unit, and configured to introduce the working fluid into a gas flow path or a cooling circuit defined by the one or more components of the gas engine such that the working fluid impinges upon a surface of the one or more components of the gas turbine engine.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings, wherein:

FIG. 5 illustrates a method for cleaning a turbine engine, in accordance with some embodiments of the disclosure;

FIG. 6 illustrates a method for cleaning a turbine engine, in accordance with some embodiments of the disclosure;

Figure 7:
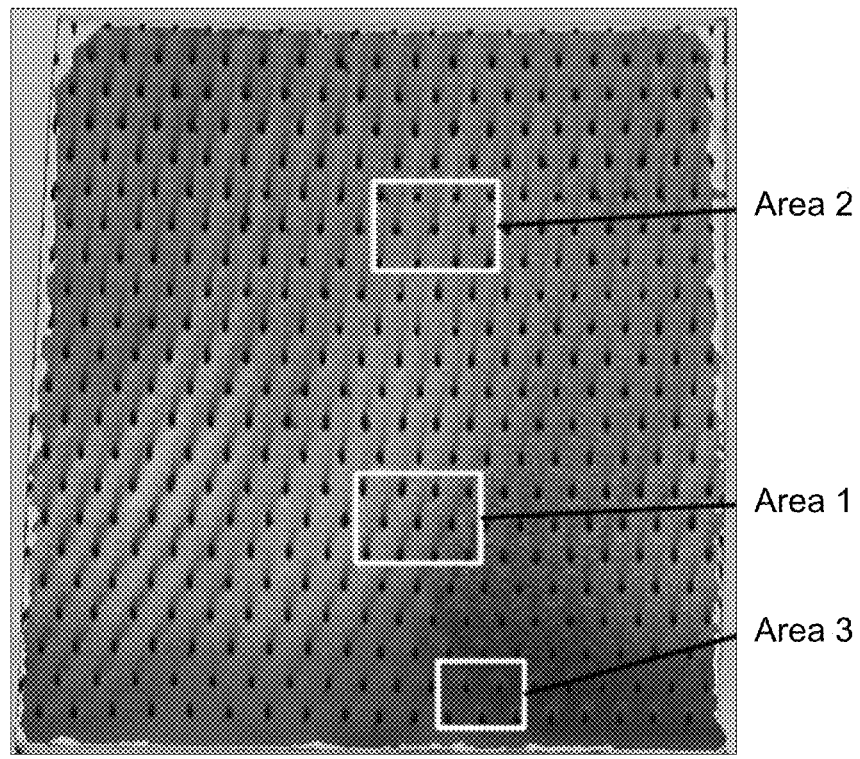

FIG. 7 is an optical image of a section of a combustor liner showing deposition of certain foulants in three areas marked area 1, area 2, and area 3.

Figure 8:
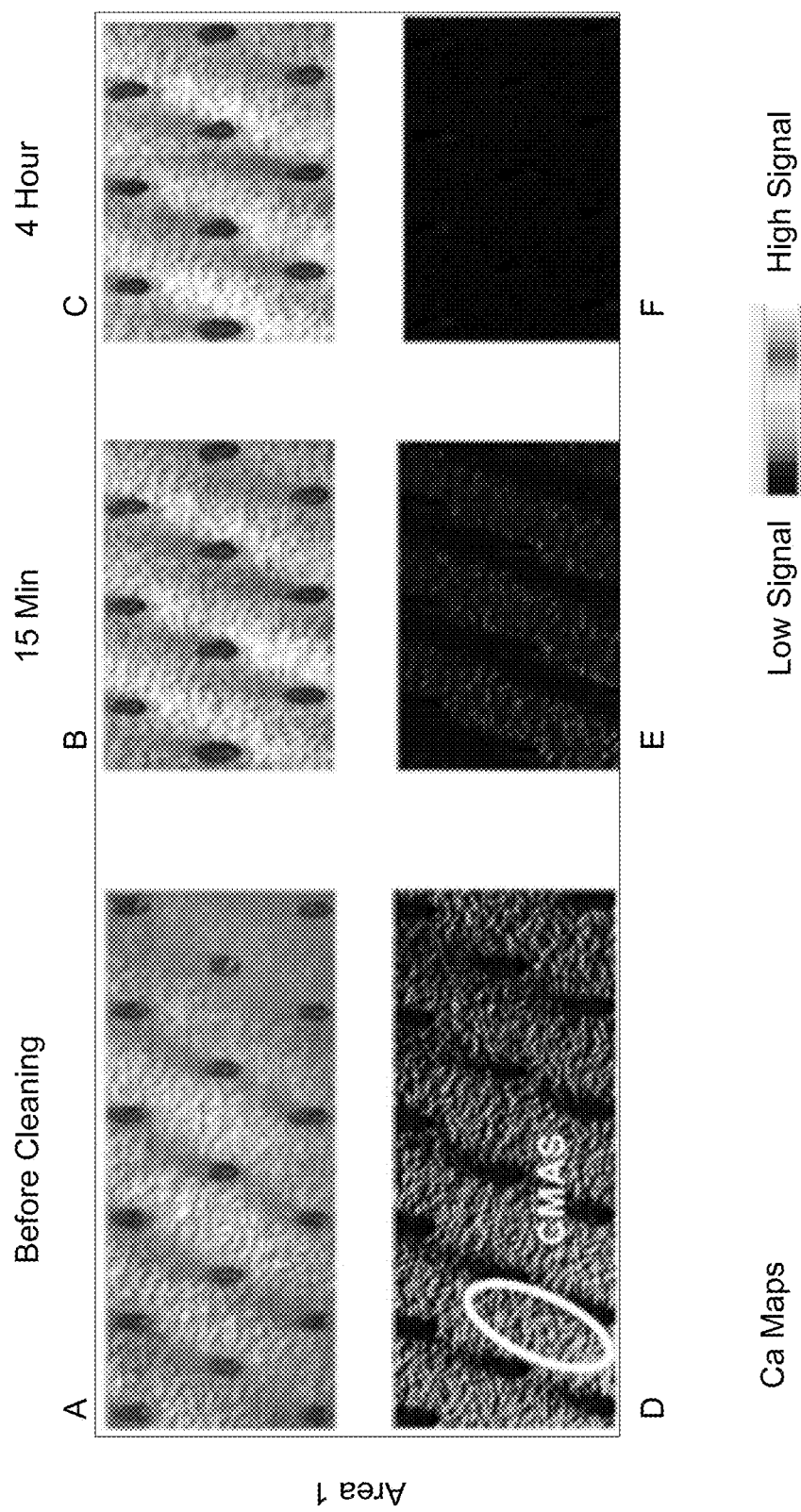

FIG. 8 Top row (A), (B) and (C) are optical images, and bottom row (D), (E) and (F) are X-ray fluorescence (XRF) scans showing calcium distribution maps, and demonstrating the effects of the cleaning methods described herein on area 1 of the combustor liner section shown in FIG. 7.

Figure 9:
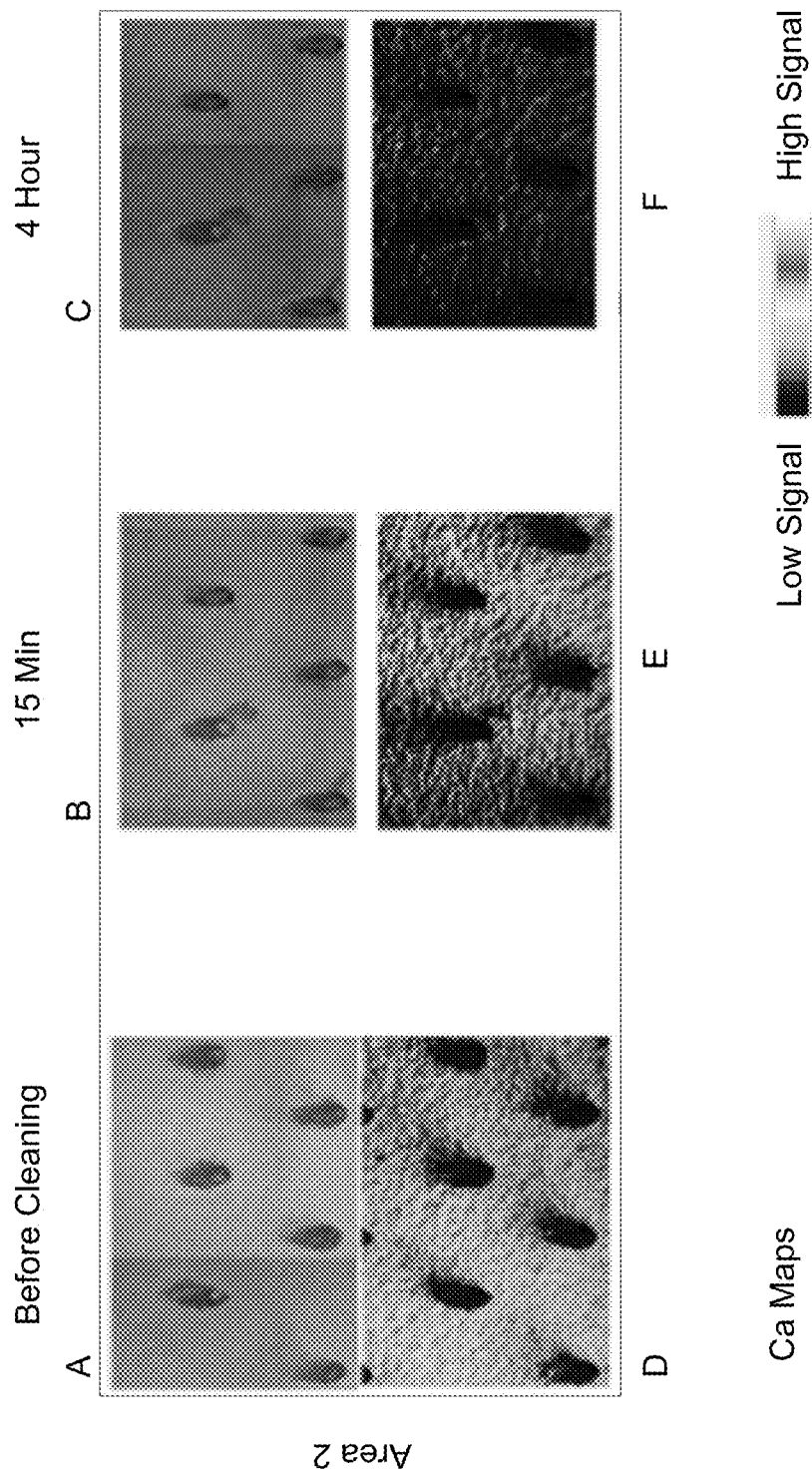

FIG. 9 Top row (A), (B) and (C) are optical images, and bottom row (D), (E) and (F) are X-ray fluorescence (XRF) scans showing calcium distribution maps, and demonstrating the effects of the cleaning methods described herein on area 2 of the combustor liner section shown in FIG. 7.

Figure 10:
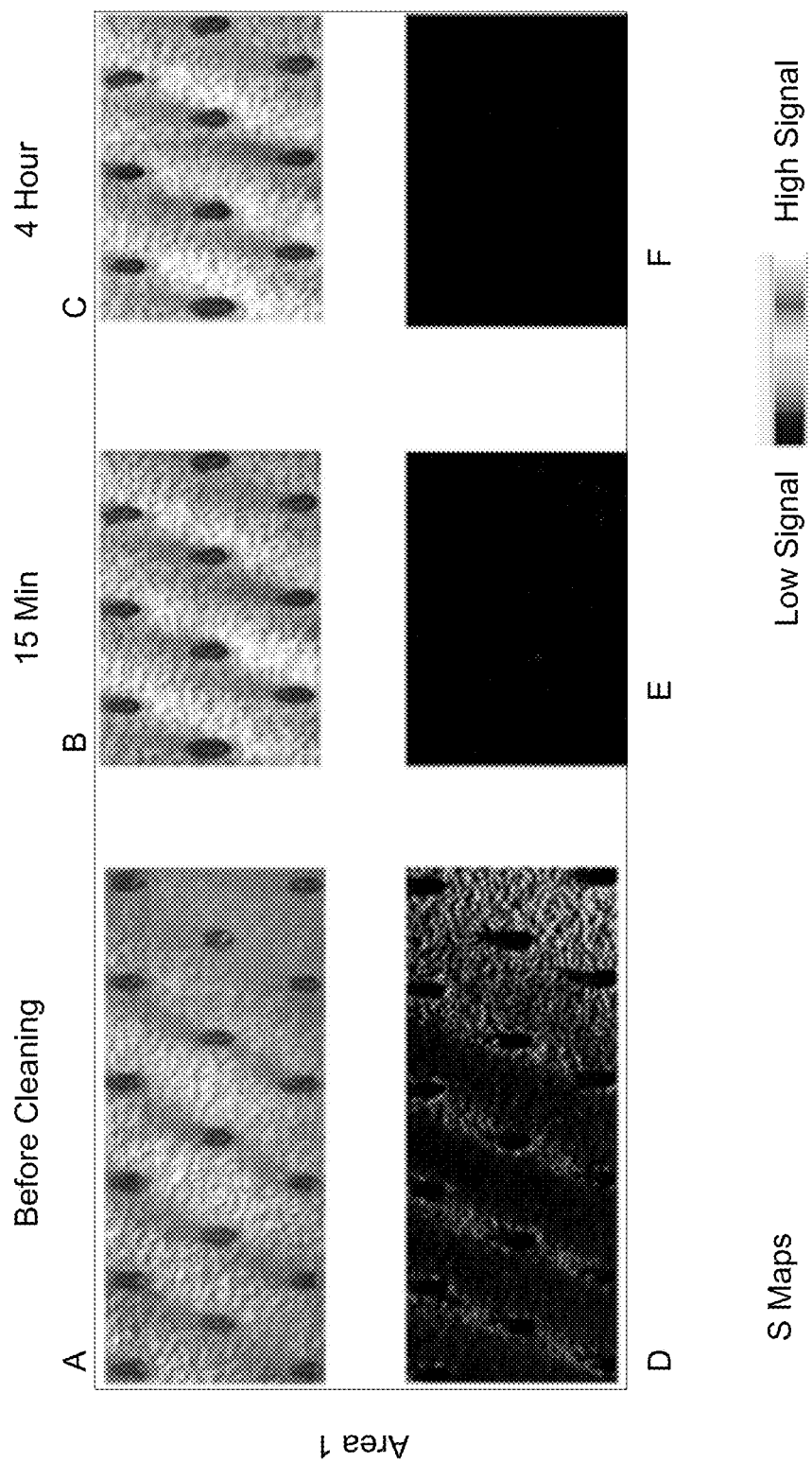

FIG. 10 Top row (A), (B) and (C) are optical images, and bottom row (D), (E) and (F) are X-ray fluorescence (XRF) scans showing sulfur distribution maps, and demonstrating the effects of the cleaning methods described herein on area 1 of the combustor liner section shown in FIG. 7.

Figure 11:
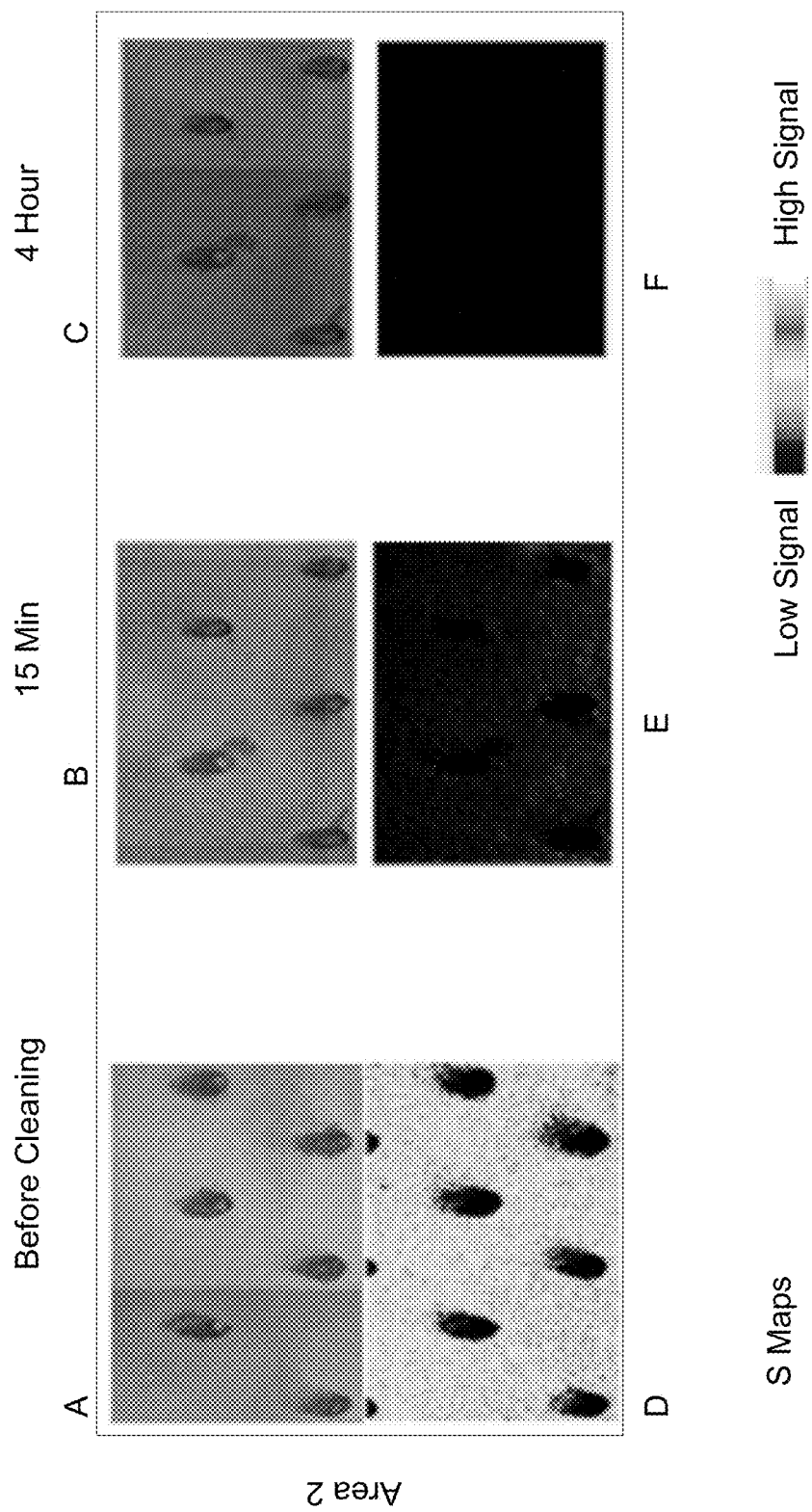

FIG. 11 Top row (A), (B) and (C) are optical images, and bottom row (D), (E) and (F) are X-ray fluorescence (XRF) scans showing sulfur distribution maps, and demonstrating the effects of the cleaning methods described herein on area 2 of the combustor liner section shown in FIG. 7.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

Embodiments of the present disclosure relate to methods and systems of cleaning one or more components of a gas turbine engine. In some embodiments, a method of cleaning includes introducing a working fluid into a gas flow path or a cooling circuit defined by the one or more components of the gas turbine engine such that the working fluid impinges upon a surface of the one or more components of the gas turbine engine, wherein the working fluid includes a plurality of detergent droplets entrained in a flow of steam.

A gas turbine engine refers to any turbine engine in which the turbine is driven by the combustion products of air and fuel. In some embodiments, the gas turbine engine may be an aircraft engine. Alternatively, the gas turbine engine may be any other type of engine used in industrial applications. Non-limiting examples of such gas turbine engines include a land-based gas turbine engine employed in a power plant, a gas turbine engine used in a marine vessel, or a gas turbine engine used in an oil rig. The terms "gas turbine engine" and "turbine engine" are used herein interchangeably.

Figure 1:
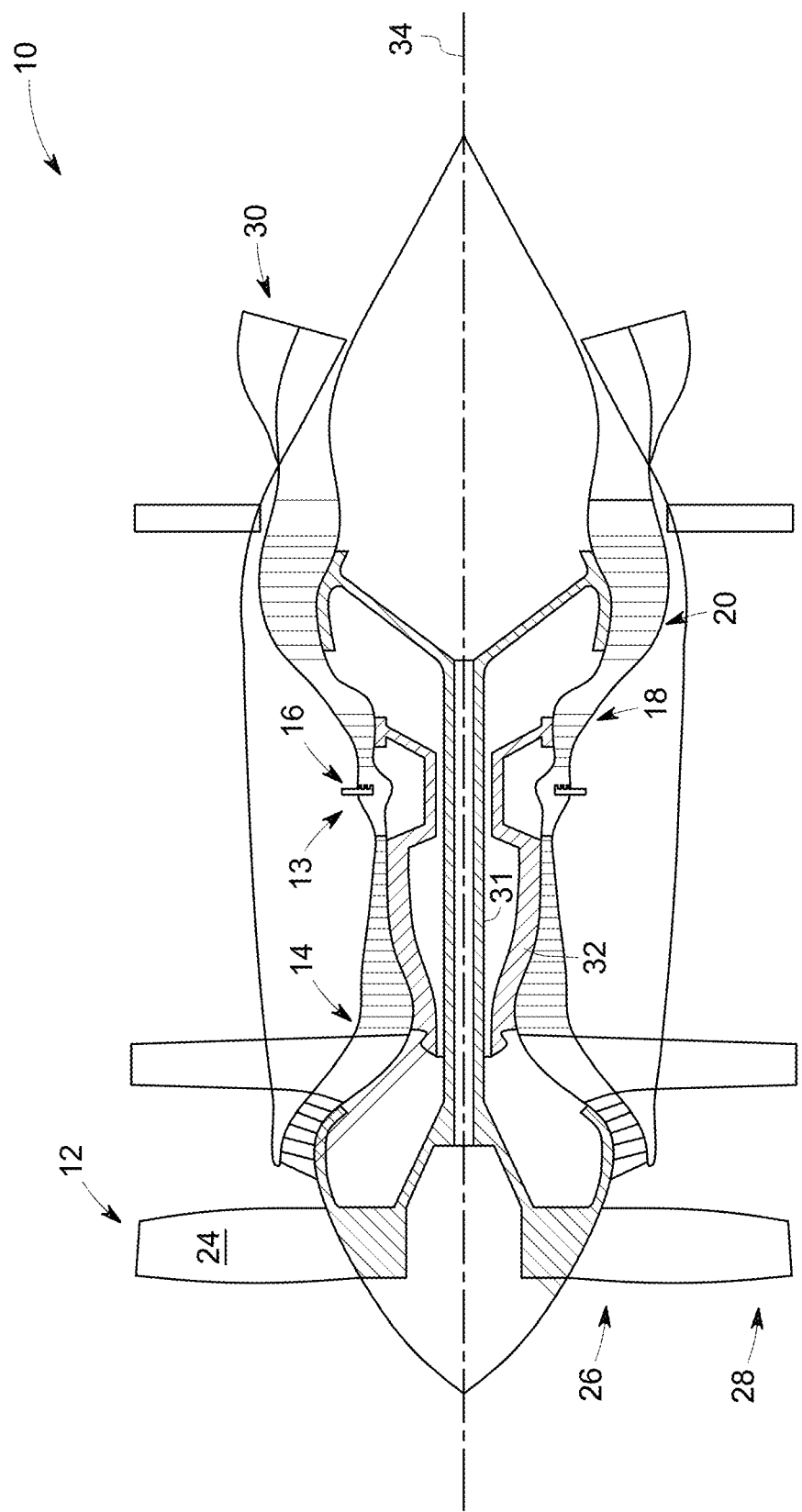
FIG. 1 is a cross-sectional view of a gas turbine engine, in accordance with some embodiments of the disclosure.

FIG. 1 is a schematic view of a representative gas turbine engine 10 in accordance with some embodiments of the disclosure. The gas turbine includes a fan assembly 12 and a core engine 13 including a high-pressure compressor 14, a combustor 16, a high-pressure turbine (HPT) 18, and a low-pressure turbine (LPT) 20. Fan assembly 12 includes an array of fan blades 24 that extend radially outward from a rotor disk 26. Engine 10 has an intake side 28 and an exhaust side 30. Fan assembly 12 and LPT 20 are coupled by a low-speed rotor shaft 31, and compressor 14 and HPT 18 are coupled by a high-speed rotor shaft 32.

Generally, in operation, air flows axially through fan assembly 12, in a direction that is substantially parallel to a centerline 34 that extends through engine 10, and compressed air is supplied to high pressure compressor 14. The highly compressed air is delivered to combustor 16. Combustion gas flow (not shown) from combustor 16 drives turbines 18 and 20. HPT 18 drives compressor 14 by way of shaft 32 and LPT 20 drives fan assembly 12 by way of shaft 31.

As noted earlier, the method and systems disclosed herein provide for cleaning of a foreign material deposited on one or more components of the turbine engine. The foreign material may be any material, such as particulate material, that is built up, introduced, or produced on or in one or more components of the turbine engine during operation of the turbine engine. In some embodiments, the foreign material may be any material that is deposited and/or produced on components of the turbine engine after initial manufacture of the turbine that decreases the efficiency of the turbine or otherwise interferes with or degrades one or more function or component of the turbine.

Non-limiting examples of the foreign material include dust (including mineral dust), sand, dirt, fly ash, volcanic ash, runway debris, or any other material or pollutant that is ingested or otherwise introduced into the engine and deposited or adhered onto one or more components. The foreign material that is cleaned using the methods and systems described herein may also include one or more of the aforementioned materials that have reacted or been otherwise altered by the heat, pressure, etc. within the engine. In some embodiments, the foreign material is a combination of soluble and insoluble dust species that have been ingested by a turbine engine and deposited (e.g., built up over time) on one or more components.

In some embodiments, the methods and systems disclosed herein provide for cleaning of CMAS-based reaction products. The term "CMAS" as used herein refers to a contaminant composition including calcium, magnesium, aluminum and silicon, resulting from the ingestion of siliceous minerals (e.g., dust, sand, volcanic ash, fly ash, cement, runway dirt, and the like) in gas turbine engines. The compositional characteristics of the CMAS-based reaction product may depend, in part, on one or more of the source of the environmental contaminants, the reaction temperature, location of the foreign material within sections of the turbine engine, or the operational environment of the turbine engine.

Non-limiting examples of turbine engine components that may be cleaned by the methods and systems disclosed herein include, but are not limited to, shrouds, buckets, blades, nozzles, vanes, combustor liners, seal components, and rotors.

As mentioned previously, to effect cleaning of the components, a working fluid is introduced into a gas flow path or a cooling circuit defined by the one or more components of the gas turbine engine such that the working fluid impinges upon a surface of the one or more components of the gas turbine engine. In some embodiments, the working fluid is introduced into at least one gas flow path in the gas turbine engine. In some embodiments, the working fluid is introduced into at least one cooling circuit in the gas turbine engine. In some embodiments, the working fluid is introduced into at least one gas flow path and at least one cooling circuit in the gas turbine engine.

The term "gas flow path" as used herein refers to one or more of a compressor flow path, a hot gas path in the combustor section, a hot gas path in the turbine section of the engine (HPT or LPT), or a secondary cooling flow path e.g., flow path between the casing and the combustor liner. The compressor flow path and the hot gas path (in the combustor section or the turbine section) may also be referred to as the core flow path. Therefore, in some embodiments, the working fluid may be introduced into one or more of the compressor flow path, the hot gas path in the combustor section, the hot gas path in the turbine section of the engine (HPT or LPT), or the secondary cooling flow path between the casing and the combustor liner, to effect cleaning of the turbine engine components defining these flow paths.

Cleaning by introducing the working fluid into the compressor flow path or the secondary cooling flow path may also be referred to as cleaning of the cold sections of the turbine engine. Similarly, cleaning by introducing the working fluid into the hot gas path in the combustor section or a hot gas path in the turbine section of the engine (HPT or LPT) may also be referred to as cleaning of the hot sections of the turbine engine. As will be appreciated by one of ordinary skill in the art, by introducing the working fluid into the appropriate gas flow path, cleaning of the turbine engine component that has been fouled may be effected. For example, to clean the compressor blades, the working fluid may be introduced into the compressor flow path. Similarly, to clean the turbine (LPT or HPT) blades, the working fluid may be introduced into the hot gas path in the turbine section.

The term "cooling circuit" as used herein refers to internal passages, film holes, or bores in the turbine engine components that are designed and configured to cool these components during use. The cooling circuits may be configured to cool the turbine engine components by convection cooling, by impingement cooling, by film cooling, or combinations thereof. In certain embodiments, the methods and systems described herein are suitable for cleaning of internal passages of a turbine blade.

The term "working fluid" as used herein refers to a mixture of steam and detergent, which is capable of selectively dissolving one or more constituents of the foreign material. As mentioned previously, the foreign material may include one or more of CMAS-based reaction products, interstitial cement, or mineral dust accumulated on the turbine components. In some embodiments, the working fluid is capable of selectively dissolving one or more of oxide-based, chloride-based, sulfate-based, and carbon-based constituents of the foreign material.

More specifically, the working fluid includes a detergent that is capable of selectively dissolving the constituents of the foreign material. As used herein, the term "selectively dissolve" refers to an ability of the detergent to be reactive with certain predetermined materials, and to be substantially unreactive with materials other than the predetermined materials. Specifically, the term "selectively dissolve" as used herein refers to a detergent that reacts with foreign matter accumulated on underlying turbine components to facilitate removal of the foreign material, but that is substantially unreactive with the material used to form the underlying turbine components to limit damage to them during removal of the foreign matter (i.e., during a cleaning operation).

A suitable detergent for the methods and systems described herein may include any detergent that conforms with Aerospace Material Specification (AMS) 1551a. In some embodiments, the detergent is formed by diluting a commercially available reagent composition to a desired strength prior to use as a working fluid. The dilution factor for the reagent composition in the detergent may be based on Federal Aviation Administration (FAA) guidelines. The FAA regulations provide acceptable elemental thresholds for compositions introduced into a turbine engine. In some embodiments, the reagent composition is diluted by a factor of up to about 75 to form the detergent.

The reagent composition used to form the detergent may include a mixture of water, an acid and water-based cleaning reagent, a surfactant, and an amine, for example, an alkanol amine. It is believed, without being bound by any particular theory, that the acid component of the detergent is a primary driver that facilitates selective dissolution of the oxide-based, chloride-based, sulfate-based, and carbon-based constituents of the foreign material. Representative acid components include, but are not limited to, citric acid, glycolic acid, poly acrylic acid, and combinations thereof. In certain embodiments, a reagent composition suitable for the methods and systems described herein is disclosed in co-pending U.S. patent application publication 2016/0024438, which disclosure is incorporated herein by reference.

In some embodiments, the detergent may include a mixture of water, an acid and water-based cleaning reagent, an organic surfactant, and a corrosion inhibitor. The detergent is designed to selectively dissolve sulfate, chloride and carbonate based species of foreign matter on turbine components while being substantially unreactive with the material forming the turbine components. In some embodiments, the detergent may further optionally include a pH buffer. In certain embodiments, a reagent suitable for the methods and systems described herein is disclosed in co-pending U.S. patent application publication 2016/0024438, which disclosure is incorporated herein by reference.

In certain embodiments, a suitable reagent composition includes water within a range between about 50 percent and about 70 percent by volume of the reagent composition, glycolic acid within a range between about 5 percent and about 15 percent by volume of the reagent composition, citric acid within a range between about 5 percent and about 15 percent by volume of the reagent composition, triethanol amine within a range between about 1 percent and about 5 percent by volume of the reagent composition, alcohol alkoxylate within a range between about 1 percent and about 5 percent by volume of the reagent composition, and isopropylamine sulfonate within a range between about 1 percent and about 10 percent by volume of the reagent composition. In some embodiments, the detergent is formed by diluting the reagent composition with water by a factor of up to about 75. The dilution is the effected such that a sulfur concentration is maintained below a permissible limit. In some such embodiments, the detergent may further include a pH buffer (for example, imidazole) and a corrosion inhibitor (for example, sodium lauriminodipropionate).

The detergent may be further characterized by it's pH. In some embodiments, the detergent has a pH in a range from about 2.5 to about 10. In some embodiments, the detergent has a pH in a range from about 2.5 to about 7. In some embodiments, the detergent has a pH in a range from about 5 to about 7. In some embodiments, the detergent has a pH of about 5.5.

As used herein, the term "steam" refers to wet steam or dry steam. That is, the steam may be as a two-phase mixture of water vapor and entrained droplets of water condensed from the water vapor, or, alternately the steam may be composed of water vapor alone. Thus, the working fluid includes a mixture of a detergent and steam where the steam is vapor or, alternatively, the steam is a combination of vapor and liquid. In some embodiments, steam may be superheated and pressurized prior to mixing with the atomized detergent. In some embodiments, steam may be characterized by temperature and water content such that after transferring heat to the detergent, it does not have a high-water droplet content and the detergent concentration is not substantially altered. In some embodiments, steam may be superheated to a temperature in a range up to 250° C.

In some embodiments, the method further includes atomizing the detergent in an atomizing nozzle and forming the working fluid. In some embodiments, the method further includes forming the working fluid by contacting the steam with the detergent. In certain embodiments, the detergent is atomized in an atomizing nozzle and the working fluid is formed by atomizing the detergent using steam in the atomizing nozzle. In some other embodiments, the working fluid is formed by mixing the atomized detergent with steam after the atomizing step.

Figure 3:
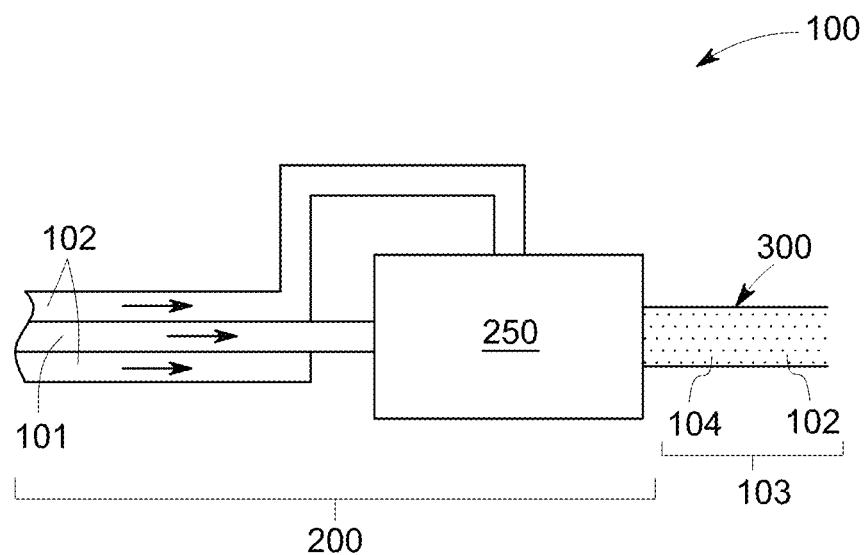
FIG. 3 illustrates a system for forming a working fluid, in accordance with some embodiments of the disclosure.

Referring now to FIGS. 3 and 5, a system 100 and a method 1000 for cleaning a gas turbine engine in accordance with one embodiment is illustrated. As shown in FIGS. 3 and 5, in some embodiments, at step 1001, the detergent 101 is introduced into an atomizing nozzle 250 along with steam 102. The detergent is atomized in the atomizing nozzle 250, at step 1002. At step 1003, a working fluid 103 is formed that includes a plurality of detergent droplets 104 (also referred to as atomized detergent 104) entrained in a flow of steam 102. As mentioned previously, in some such embodiments, the detergent 101 may be atomized using steam 102 in the atomizing nozzle 250 to form the working fluid 103. In the embodiments illustrated in FIG. 3, the detergent and steam are introduced through separate inlets of the atomizing nozzle 250. However, embodiments wherein the steam and detergent are pre-mixed and then introduced into atomizing nozzle via the same inlet are also within the scope of the present disclosure. The working fluid is 103 is further discharged into a fluid delivery mechanism 300, at step 1004. As noted previously, the method further includes, at step 1005, introducing the working fluid 103 into the gas flow path or the cooling circuit of the turbine engine by any suitable delivery mechanism 300.

Figure 4:
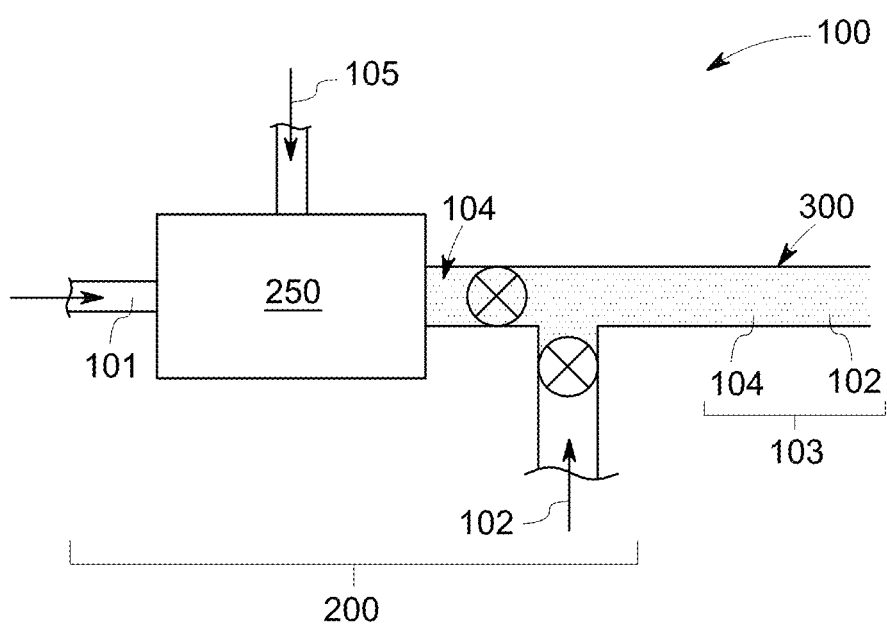
FIG. 4 illustrates a system for forming a working fluid, in accordance with some embodiments of the disclosure.

Referring now to FIGS. 4 and 6, a system 100 and a method 2000 for cleaning a gas turbine engine in accordance with another embodiment is illustrated. As shown in FIGS. 4 and 6, in some embodiments, the detergent 101 is first introduced into an atomizing nozzle at step 2001. At step 2002, the detergent is atomized in the atomizing nozzle 250 to form an atomized detergent 104. The method 2000 further includes discharging the atomized detergent 104 into a flow of steam 102, at step 2003. The atomized detergent 104 is mixed with steam 102 after the step of atomizing to form the working fluid 103, at step 2004. In the embodiment illustrated in FIGS. 4 and 6, the method 2000 may further include introducing a suitable fluid (e.g., high pressure air) 105 into the atomizing nozzle 250 to form the atomized detergent 104. The working fluid is 103 is further discharged into a fluid delivery mechanism 300, at step 2005. As noted previously, the method further includes, at step 2006, introducing the working fluid 103 into the gas flow path or the cooling circuit of the turbine engine by any suitable delivery mechanism 300.

The method further includes controlling a size distribution of the plurality of detergent droplets in the working fluid such that the size distribution is effective to be substantially accommodated in the gas flow path or the cooling circuit. The term "substantially accommodated" as used herein means that the size distribution is controlled such that the plurality of detergent droplets can enter and follow the gas flow path or the cooling circuit, and impact on surfaces that need to be cleaned. Inventors of the present disclosure have recognized and determined that by controlling the size distribution of the plurality of detergent droplets in the working fluid effective cleaning may be achieved.

The size distribution of the plurality of detergent droplets is therefore carefully controlled depending on the component that requires cleaning. For example, a size distribution required for cleaning a gas flow path may be different from that of the size distribution required for cleaning a cooling circuit. Similarly, even for cleaning a cooling circuit, for example, the size distribution may be controlled depending on the location and size of the cooling circuit.

In some embodiments, the method includes controlling a size distribution of the detergent droplets such that the detergent droplets may be substantially accommodated in a gas flow path of the turbine engine. In some embodiments, 50 percent of the plurality of detergent droplets is characterized by a size smaller than 500 microns. In some embodiments, 75 percent of the plurality of detergent droplets is characterized by a size smaller than 500 microns. In some embodiments, 90 percent of the plurality of detergent droplets is characterized by a size smaller than 500 microns. In some embodiments, 50 percent of the plurality of detergent droplets is characterized by a size smaller than 250 microns. In some embodiments, 75 percent of the plurality of detergent droplets is characterized by a size smaller than 250 microns. In some embodiments, 90 percent of the plurality of detergent droplets is characterized by a size smaller than 250 microns.

In some embodiments, the method includes controlling a size distribution of the detergent droplets such that the detergent droplets may be substantially accommodated in a cooling circuit of the turbine engine. In some embodiments, 50 percent of the plurality of detergent droplets is characterized by a size smaller than 100 microns. In some embodiments, 75 percent of the plurality of detergent droplets is characterized by a size smaller than 100 microns. In some embodiments, 90 percent of the plurality of detergent droplets is characterized by a size smaller than 100 microns.

Inventors of the present disclosure have recognized and determined that the size distribution of the plurality of detergent droplets is dependent at least in part on one or more of a detergent flow rate, a steam pressure, or an atomizing nozzle geometry. Therefore, methods and systems as described herein include varying one or more of a detergent flow rate, a steam pressure, or an atomizing nozzle geometry to control the size distribution of the plurality of detergent droplets.

In some embodiments, a method for in-situ cleaning of a cooling circuit defined by one or more components of a gas turbine engine is also presented. The method includes forming a working fluid that includes a plurality of detergent droplets entrained in a flow of steam. The plurality of detergent droplets is characterized by a size distribution that is effective to be substantially accommodated in the cooling circuit, as described herein previously. The method further includes introducing the working fluid into the cooling circuit such that the working fluid impinges upon a surface of the one or more components of the gas turbine engine.

In some embodiments, the detergent may be further heated before the atomizing step. In some embodiments, the method includes heating the detergent before the step of contacting with steam. In some such instances the detergent may be heated using any suitable heating medium or mechanism. In some embodiments, the method includes heating the detergent by contacting the detergent with steam. In some such instances, the steam also works as the heat source to generate droplets in the temperature range where cleaning effectiveness is maximized. Referring again to FIG. 3, for example, the detergent 101 may be heated by contacting the detergent with steam 102. In the embodiments illustrated in FIG. 3, the detergent is heated by coaxially flowing the detergent through two flows of steam 102. Other configurations are also within the scope of the disclosure. Alternatively, for embodiments depicted in FIG. 4, the detergent may be heated using any other suitable medium or mechanism. In the embodiments illustrated in FIG. 4, the detergent may be heated before being introduced into the atomizing nozzle, or, may be heated in the atomizing nozzle itself prior to the atomizing step (e.g., using hot air).

In some embodiments, the method may include controlling the total quality of the working fluid. The total quality of the working fluid is defined as the ratio of the mass of the vapor content to the total mass of the working fluid. The total quality is specified such that after mixing steam and detergent, the detergent concentration is not substantially altered. In some embodiments, the working fluid quality may be in a range of 0.05 to 1.0.

In some embodiments, the quality of the working fluid is controlled by heating the detergent to a temperature in a range from about 40° C. to about 130° C. In some embodiments, the detergent may be heated to a temperature in a range from about 60° C. to about 100° C.

In some embodiments, the working fluid quality is controlled by controlling the steam quality and temperature, which may include dry, wet and superheated steam states. In some embodiments, the steam quality before mixing with the detergent is in the range of 0.2 to 1.0. In certain embodiments, the superheated steam temperature may be in a range from about 101° C. to about 250° C.

The cleaning methods and systems described herein employ a combined thermal and rinsing effect of steam along with the cleaning effect of detergent to effect cleaning of the turbine engine components. Without being bound by any theory, it is believed that by using a mixture of steam and atomized detergent, the detergent amount required to clean the components, the cycle time for cleaning, and the heating requirements for the detergent may significantly reduce. Further, the methods and systems described herein may provide for an enhanced coverage of the turbine engine components with the detergent. This is in contrast to conventional cleaning systems that use air atomized detergents, or sequential application of steam and detergent.

After the step of forming the working fluid, the working fluid may be introduced into the gas flow path or the cooling circuit through one or more access ports or apertures in the turbine. Non-limiting examples of suitable access ports or apertures include, borescope apertures, burner apertures, pressure sensor ports, fuel nozzle apertures, or combinations thereof. In some embodiments, the working fluid may be introduced into the gas flow path or the cooling circuit without substantial disassembly of the turbine engine. In certain embodiments, the working fluid is introduced into the gas flow path or the cooling circuit through at least one borescope inspection port of the gas turbine engine.

In some embodiments, the working fluid is introduced into the turbine engine such that the working fluid impinges on the surface of one or more components to be cleaned. For example, as mentioned earlier, in some embodiments the methods and systems described herein may be used for cleaning compressor blades. In such instances, the working fluid may be introduced into the compressor flow path such that the working fluid impinges on a soiled surface of the compressor blades. Similarly, in some embodiments, the methods and systems described herein may be used for cleaning a combustor liner. In such instances, the working fluid may be introduced into the secondary cooling flow path such that the working fluid impinges on a soiled surface of the combustor liner. In some further embodiments, the methods and systems described herein may be used for cleaning internal cooling passages of a turbine blade. In such instances, the working fluid may be introduced into the internal cooling passages such that the working fluid impinges on a soiled inner surface of the turbine blade.

In some embodiments, the working fluid is introduced at a flow rate in a range from about 10 standard cubic feet per hour (SCFH) to about 2000 SCFH. In some embodiments, the working fluid is introduced at a flow rate in a a range from about 20 standard cubic feet per hour (SCFH) to about 1000 SCFH.

In some embodiments, the gas turbine engine is a fully assembled gas turbine engine, or a sub-assembly of a gas turbine engine and the cleaning is effected without disassembly of the engine. In some embodiments, the sub-assembly of the turbine engine which is cleaned is the compressor section/module or the combustion section/module. In some embodiments, the sub-assembly of the turbine engine which is cleaned is the booster assembly/module, the high-pressure turbine assembly/module, or the low-pressure turbine assembly/module.

In some embodiments, the methods and systems described herein allow for in-situ cleaning of a gas turbine engine. The term "in-situ" cleaning of a gas turbine engine means that the gas turbine engine is a substantially assembled state and not detached from the aircraft or is installed in an industrial application (e.g., in a power plant, a marine vessel, an oil rig, pump, and the like). In some embodiments, the gas turbine engine is disposed on an aircraft, and the cleaning is effected on wing. In some embodiments, the gas turbine engine is installed in an industrial application. Non-limiting examples of industrial applications include power plants, marine vessels, oil rigs, pumps, and the like.

Figure 2:
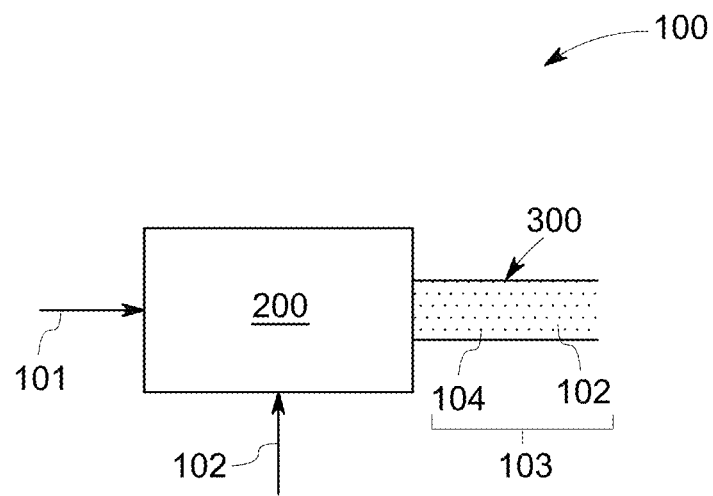
FIG. 2 illustrates a system for forming a working fluid, in accordance with some embodiments of the disclosure.

A system for cleaning one or more components of a gas turbine engine is also presented. A system 100 in accordance with some embodiments of the disclosure is illustrated in FIG. 2. As shown in FIG. 2, the system 100 includes a fluid mixing unit 200 configured to form a working fluid 103 including a plurality of detergent droplets 104 entrained in a flow of steam 102. The fluid mixing unit 200 is configured to form the working fluid 103 by atomizing the detergent 101 and mixing the atomized detergent with steam 102. The system 100 further includes a fluid delivery mechanism 300 fluidly coupled with the fluid mixing unit 200, and configured to introduce the working fluid 103 into a gas flow path or a cooling circuit defined by the one or more components of the gas engine (not shown in FIG. 2), such that the working fluid impinges upon a surface of the one or more components of the gas turbine engine.

The term "fluid mixing unit" as used herein refers to a component or combination of components capable of forming detergent droplets and mixing the atomized detergent with steam. Therefore, the fluid mixing unit may include one or more components capable of forming detergent droplets. Non-limiting example of such a component includes an atomizing nozzle. The fluid mixing unit may further include one or more conduits for delivering one or more of detergent, pressurized air, or steam into the atomizing nozzle, for example. The fluid mixing unit may further include one or more conduits for discharging the atomized detergent or the working fluid from the atomizing nozzle, for example. In some embodiments, the fluid mixing unit may further include suitable fluid control mechanisms such as valves to control the flow into or out of the atomizing nozzle.

The term "fluid delivery mechanism" as used herein refers to a unit capable of delivering the working fluid from the fluid mixing unit to the gas flow path or the cooling circuit of the turbine engine. Non-limiting examples of suitable fluid delivery mechanism include conduits, tube, pipes, and the like.

In some embodiments, as illustrated in FIG. 3, the fluid mixing unit 200 includes an atomizing nozzle 250 configured to (i) receive a detergent 101, (ii) receive steam 102, (iii) form the working fluid 103 by atomizing the detergent using steam, and (iv) discharge the working fluid 103 into the fluid delivery mechanism 300.

In some embodiments, as illustrated in FIG. 4, the fluid mixing unit 200 includes an atomizing nozzle 250 configured to (i) receive a detergent 101, (ii) atomize the detergent, and (iii) discharge the atomized detergent 104 into a flow of steam 102 to form the working fluid 103. The working fluid 103 as shown in FIG. 4 may be further discharged into the fluid delivery mechanism 300. As noted previously, the fluid delivery mechanism is fluidly coupled with a gas flow path or a cooling circuit of a gas turbine engine. In some embodiments, the gas flow path is a hot gas path of the gas turbine engine and the fluid delivery mechanism 300 is fluidly coupled with the hot gas path (not shown). In some embodiments, the fluid delivery mechanism 300 is fluidly coupled with the cooling circuit of the gas turbine engine (not shown). As mentioned previously, the fluid delivery mechanism 300 may be fluidly coupled with the gas flow path or the cooling circuit via one or more access ports or apertures in the turbine engine.

An exemplary technical effect of the methods and systems, described herein, includes at least one of (a) enabling in-situ cleaning of turbine engines; (b) selectively dissolving foreign material having different elemental compositions from materials of general turbine engine constructions; and (c) reducing downtime of the turbine engines cleaned by the methods described herein. Further, advantageously, in accordance with some embodiments of the disclosure, the methods and systems described herein are environmentally friendly and non-toxic, and can be employed without the need for specialized ventilation or ventilated spaces such as hoods, or, any expensive personal protective equipment for technicians effecting the cleaning.

EXAMPLES

Example 1 Forming the Working Fluid Including Steam Atomized Detergent

A detergent composition as described in US patent application publication 2016/0024438 (Reagent 6) was heated to 92° C., and passed through Teflon-lined tubing at a flow rate of 75 mL/minute using a peristaltic pump into an atomizing nozzle that was simultaneously flowing 300° F. (148.8° C.) steam at 4 SCFH (standard cubic feet hour) to generate a mixture of steam and atomized detergent (working fluid).

Example 2 Cleaning a Fouled Turbine Engine Component (Combustor Liner) with the Working Fluid The working fluid formed in Example 1 was contacted with a fouled surface of a combustor liner as an example of flow path cleaning. Referring to FIG. 7, an optical image of a portion of a combustor liner from HPT 18 section of turbine engine 10 (shown in FIG. 1) shows fouling in certain areas, marked as areas 1, 2 and 3 in FIG. 7. Area 1 exhibited CMAS deposition as a white streaked, continuous layer. Area 2 exhibited intermediate, discontinuous layers of CMAS along with dust (sulfates and clay) fused on the thermal barrier coating (TBC) surface. Area 3 exhibited dark brown, dust fused on the thermal barrier TBC surface with negligible CMAS formation. The combustor liner was exposed to the working fluid for 15 minutes to 4 hours.

The cleaning effectiveness of the working fluid on areas 1 and 2 was determined using x-ray fluorescence (XRF) spectrometry. Referring to FIGS. 8 and 9, the XRF scans show calcium distribution maps and demonstrate the effects of the cleaning methods described herein on area 1 (FIG. 8) and area 2 (FIG. 9) of the fouled combustor liner mentioned above. FIGS. 8 and 9, top row (A), (B) and (C) are optical images, and bottom row (D), (E) and (F) are XRF scans showing the calcium distribution. The effect of 15 minutes and 4 hours of cleaning using the working fluid formed in Example 1 was shown. A darker image (i.e., low signal) in the bottom row indicates effective cleaning (i.e., removal of calcium sulfate).

Referring to FIGS. 10 and 11, the XRF images show sulfur distribution maps and demonstrate the effects of the cleaning methods described herein on area 1 (FIG. 10) and area 2 (FIG. 11) of the fouled combustor liner mentioned above. FIGS. 10 and 11, top row (A), (B) and (C) are optical images, and bottom row (D), (E) and (F) are XRF scans showing the sulfur distribution. The effect of 15 minutes and 4 hours of cleaning using the working fluid formed in Example 1 was shown. A darker image (i.e., low signal) in the bottom row indicates effective cleaning (i.e., removal of calcium sulfate).

Comparative Example 1: Cleaning a Fouled Turbine Engine Component (Combustor Liner) with Only Steam A fouled combustor liner (as described in Example 2) was contacted with steam for 15 hours to determine the effective of cleaning with steam on its own. Cleaning effectiveness was determined using electron probe microanalyzer (EMPA) and by determining the chemical composition (calcium, sulfur, magnesium and iron distribution) of the area that was cleaned before and after contacting with steam. As will be appreciated by one of ordinary skill in the art, EMPA analysis proves full depth information for the sample being analyzed while pXRF provides surface analysis. EMPA analysis of the area that was cleaned showed that the elements calcium, sulfur, magnesium and iron were present in the sample before as well as after contacting the sample with steam.

Comparative Example 2: Cleaning a Fouled Turbine Engine Component (Combustor Liner) with Only Detergent A fouled combustor liner (as described in Example 2) was contacted with a foamed detergent composition (as described in US patent application publication 2016/0024438) for 15 hours to determine the effective of cleaning with detergent on its own. Cleaning effectiveness was determined using electron probe microanalyzer (EMPA) and by determining the chemical composition (calcium, sulfur, magnesium and iron distribution) of the area that was cleaned before and after contacting with detergent. EMPA analysis of the area that was cleaned showed that the elements calcium, sulfur, magnesium and iron were present in the sample before as well as after contacting the sample with the detergent

Example 3 Cleaning a Fouled Turbine Engine Component (Combustor Liner) with a Mixture of Steam and Atomized Detergent A fouled combustor liner (as described in Example 2) was contacted with the working fluid of Example 1 for 15 hours to determine the effectiveness of cleaning with a mixture of steam and atomized detergent (working fluid). Cleaning effectiveness was determined using electron probe microanalyzer (EMPA) and by determining the chemical composition (calcium, sulfur, magnesium and iron distribution) of the area that was cleaned before and after contacting with steam and atomized detergent. EMPA analysis of the area that was cleaned showed that the elements calcium, sulfur, magnesium and iron were present in the sample before contacting the sample with the working fluid. In contrast, the elemental concentration of these elements was significantly reduced after contacting the sample with the working fluid. A measurable decrease in the total thickness of the CMAS layer was also observed, thereby demonstrating that a mixture of steam and atomized detergent provides for effective cleaning of dust-related deposits.

Example 4 Cleaning a Fouled Turbine Engine Component (HPT Stage 1 Blades) with the Working Fluid A detergent composition as described in US patent application publication 2016/0024438 (Reagent 6) was heated to 80° C., and passed through Teflon-lined tubing at a flow rate of 100 mL/minute using a peristaltic pump into an atomizing nozzle that was simultaneously flowing 300° F. (148.8° C.) steam at 4 SCFH (standard cubic feet hour) to generate a mixture of steam and atomized detergent (working fluid). The working fluid was contacted with a fouled surface of a HPT blade. This was replicated on three blades from the same rotor, and the average airflow restoration was measured on the dirty blades and the cleaned blades. The average airflow restoration on the lead edge was 5% (clean relative to the dirty flow check). This indicated that the working fluid was effective in cleaning the turbine blades. Examples 2-4 show that by using steam atomized detergent, according to embodiments of the invention, the flow path and the cooling circuits in a gas turbine engine can be effectively cleaned.

The foregoing examples are merely illustrative, serving to exemplify only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of" Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method for cleaning one or more components of a gas turbine engine, comprising:
    forming a working fluid having droplets of a detergent entrained in a flow of steam, wherein forming the working fluid includes controlling a size distribution of the droplets of the detergent;
    introducing the working fluid into a gas flow path and a cooling circuit defined by the one or more components of the gas turbine engine such that the working fluid impinges upon a surface of the one or more components of the gas turbine engine, wherein the size distribution of the droplets of the detergent includes droplets of the detergent in the working fluid having a range of different sizes, wherein a first portion of the droplets has a size smaller than 100 microns and is for cleaning the gas flow path of a compressor of the gas turbine engine, a second portion of the droplets has a size between 100 microns and 500 microns and is for cleaning one or more of the gas flow path of a combustor of the gas turbine engine or one or more internal passages of the cooling circuit of the combustor, and a third portion of the droplets has a size smaller than 600 microns and is for cleaning one or more gas flow path surfaces of a turbine section of the gas turbine engine and one or more internal passages of the cooling circuit of the turbine section greater than 500 microns; and
    changing controlling the size distribution of the droplets based on the one or more components that require cleaning by controlling a steam pressure of the flow of steam in which the droplets of the detergent are entrained;
    wherein forming the working fluid includes atomizing the detergent in an atomizing nozzle prior to discharging the working fluid from a fluid delivery mechanism.

2. The method of claim 1, wherein the size distribution of the droplets of the detergent in the working fluid is controlled to be effective to be substantially accommodated in the gas flow path and the cooling circuit.

3. The method of claim 1, wherein at least 50 percent of the droplets of the detergent have a size smaller than 500 microns.

4. The method of claim 1, wherein at least 50 percent of the droplets of the detergent have a size smaller than 100 microns.

5. The method of claim 1, further comprising varying one or more of a detergent flow rate, the steam pressure, or an atomizing nozzle geometry to control the size distribution of the droplets of the detergent in the working fluid.

6. The method of claim 1, wherein forming the working fluid includes is formed during atomizing the detergent using the flow of steam.

7. The method of claim 1, wherein the working fluid is configured to selectively dissolve one or more constituents of foreign material on the surface of the one or more components of the gas turbine engine.

8. The method of claim 1, further comprising heating the detergent before atomizing by contacting the detergent with the flow of steam.

9. The method of claim 1, wherein the detergent has a pH in a range from about 2.5 to about 7.

10. The method of claim 1, wherein the gas flow path is a hot gas path in the gas turbine engine.

11. The method of claim 1, wherein the gas turbine engine is disposed on an aircraft or installed in an industrial application.

12. A method for in-situ cleaning of a gas flow path and a cooling circuit defined by one or more components of a gas turbine, comprising:
    forming a working fluid having droplets of a detergent entrained in a flow of steam, wherein forming the working fluid includes controlling a size distribution of the droplets of the detergent; and
    introducing the working fluid into the gas flow path and the cooling circuit such that the working fluid is configured to impinge upon a surface of the one or more components of the gas turbine engine,
    wherein the size distribution of the droplets of the detergent includes the droplets of the detergent in the working fluid having a range of different sizes, wherein a first portion of the droplets has a size smaller than 100 microns and is for cleaning the gas flow path of a compressor of the gas turbine engine, a second portion of the droplets has a size between 100 microns and 500 microns and is for cleaning one or more of the gas flow path of a combustor of the gas turbine engine or one or more internal passages of the cooling circuit of the combustor, and a third portion of the droplets has a size smaller than 600 microns and is for cleaning one or more gas flow path surfaces of a turbine section of the gas turbine engine and one or more internal passages of the cooling circuit of the turbine section greater than 500 microns, and
    wherein the size distribution of the droplets of the detergent in the working fluid is controlled to be effective to be substantially accommodated in the gas flow path or the cooling circuit by controlling a steam pressure of the flow of steam in which the droplets of the detergent are entrained;
    wherein forming the working fluid includes atomizing the detergent in an atomizing nozzle prior to discharging the working fluid from a fluid delivery mechanism.

13. The method of claim 12, wherein at least 50 percent of the droplets of the detergent have a size smaller than 500 microns.

14. The method of claim 13, wherein forming the working fluid includes atomizing the detergent in an atomizing nozzle.

15. The method of claim 14, wherein the working fluid is configured to selectively dissolve one or more constituents of foreign material on the one or more surfaces surface of the one or more components of the gas turbine engine.

16. A method for cleaning one or more components of a gas turbine engine, comprising:
    forming a working fluid having droplets of a detergent entrained in a flow of steam, wherein forming the working fluid includes controlling a size distribution of the droplets of the detergent;
    introducing the working fluid into a gas flow path and a cooling circuit defined by the one or more components of the gas turbine engine such that the working fluid impinges upon a surface of the one or more components of the gas turbine engine, wherein the size distribution of the droplets of the detergent includes droplets of the detergent in the working fluid having a range of different sizes, wherein a first portion of the droplets has a size smaller than 100 microns and is for cleaning the gas flow path of a compressor of the gas turbine engine, a second portion of the droplets has a size between 100 microns and 500 microns and is for cleaning one or more of the gas flow path of a combustor of the gas turbine engine or one or more internal passages of the cooling circuit of the combustor, and a third portion of the droplets has a size smaller than 600 microns and is for cleaning one or more gas flow path surfaces of a turbine section of the gas turbine engine and one or more internal passages of the cooling circuit of the turbine section;
    wherein forming the working fluid includes atomizing the detergent in an atomizing nozzle prior to discharging the working fluid from a fluid delivery mechanism.

17. The method of claim 16, wherein forming the working fluid includes atomizing the detergent with the flow of steam.

18. The method of claim 17, further comprising controlling the size distribution of the droplets by controlling one or more of a detergent flow rate, a steam pressure of the flow of steam which the droplets of the detergent are entrained, or a geometry of an atomizing nozzle.

19. The method of claim 18, wherein the size distribution of the droplets of the detergent in the working fluid is controlled to be effective to be substantially accommodated in the gas flow path and the cooling circuit of the gas turbine engine.

\* \* \* \* \*

UNITED STATES PATENT AND TRADEMARK OFFICE
CERTIFICATE OF CORRECTION

PATENT NO. : 11,174,751 B2
APPLICATION NO. : 15/443048
DATED : November 16, 2021
INVENTOR(S) : Ambarish Jayant Kulkarni et al.

It is certified that error appears in the above-identified patent and that said Letters Patent is hereby corrected as shown below:

In the Claims

Claim 14, Column 15, Line 47, delete "claim 13," and insert -- claim 12, --,

Claim 15, Column 16, Line 1, delete "claim 14," and insert -- claim 12, --,

Claim 18, Column 16, Line 39 (approximate), delete "claim 17," and insert -- claim 16, --.

Signed and Sealed this
Second Day of August, 2022

Katherine Kelly Vidal
*Director of the United States Patent and Trademark Office*